(12) United States Patent
Yao

(10) Patent No.: US 7,282,893 B2
(45) Date of Patent: Oct. 16, 2007

(54) METHOD AND APPARATUS FOR GENERATOR CONTROL

(75) Inventor: Yuan Yao, Mississauga (CA)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 11/710,525

(22) Filed: Feb. 26, 2007

(65) Prior Publication Data
US 2007/0159139 A1   Jul. 12, 2007

Related U.S. Application Data

(62) Division of application No. 10/936,399, filed on Sep. 8, 2004, now Pat. No. 7,196,498.

(51) Int. Cl.
*H02P 9/00* (2006.01)

(52) U.S. Cl. .............................. 322/37; 322/25; 322/27; 322/28; 361/64; 323/272

(58) Field of Classification Search .................. 322/24, 322/25, 27, 28, 37, 99; 361/64; 323/272
See application file for complete search history.

(56) References Cited

U.S. PATENT DOCUMENTS

| | | | |
|---|---|---|---|
| 3,656,048 A * | 4/1972 | Hauf .............................. 322/19 |
| 3,855,519 A * | 12/1974 | Waldmann .................... 322/20 |
| 3,996,507 A | 12/1976 | Chambers |
| 4,044,296 A | 8/1977 | Dhyanchand et al. |
| 4,106,069 A | 8/1978 | Trautner et al. |
| 4,777,425 A | 10/1988 | MacFarlane |
| 4,807,106 A | 2/1989 | Baker et al. |
| 4,924,170 A | 5/1990 | Henze |
| 5,013,996 A | 5/1991 | Conzelmann et al. |
| 5,017,857 A | 5/1991 | Fox |
| 5,055,765 A | 10/1991 | Rozman et al. |
| 5,166,538 A | 11/1992 | Norton |
| 5,172,048 A | 12/1992 | Giaccardi et al. |
| 5,262,711 A | 11/1993 | Mori et al. |
| 5,390,068 A * | 2/1995 | Schultz et al. ................. 361/95 |
| 5,477,162 A | 12/1995 | Heikkila |
| 5,497,070 A | 3/1996 | Furutani et al. |
| 5,581,172 A | 12/1996 | Iwatani et al. |
| 5,583,420 A | 12/1996 | Rice et al. |
| 5,754,033 A | 5/1998 | Thomson |
| 5,886,504 A | 3/1999 | Scott et al. |
| 6,097,178 A | 8/2000 | Owen et al. |
| 6,166,525 A * | 12/2000 | Crook .......................... 322/11 |
| 6,201,382 B1 * | 3/2001 | Kusumoto et al. .......... 323/356 |

(Continued)

*Primary Examiner*—Nicholas Ponomarenko
(74) *Attorney, Agent, or Firm*—Birch, Stewart, Kolasch & Birch, LLP

(57) ABSTRACT

A generator control circuit is provided that includes a first circuit (44) monitoring a generator voltage change rate and producing a first output when the voltage change rate is above a first level, a second circuit (48) monitoring a generator current change rate and producing a second output when the current change rate is above a second level, and a third circuit (13, 28) operatively connected to the first circuit (44) and the second circuit (48) for decreasing a power level supplied to the generator when a plurality of conditions are satisfied, the plurality of conditions including the voltage change rate being above the first level and the current change rate being above the second level. A method of controlling a generator is also disclosed.

12 Claims, 4 Drawing Sheets

U.S. PATENT DOCUMENTS 6,326,772 B2 * 12/2001 Kusumoto et al. .......... 320/166
6,522,106 B2    2/2003 Matsumoto et al.
6,801,027 B2   10/2004 Hann et al.
6,894,464 B2 *  5/2005 Zhang ..................... 323/268
6,965,220 B2   11/2005 Kernahan et al.
6,975,494 B2 * 12/2005 Tang et al. ................ 361/64
7,196,498 B2 *  3/2007 Yao ........................... 322/25

* cited by examiner

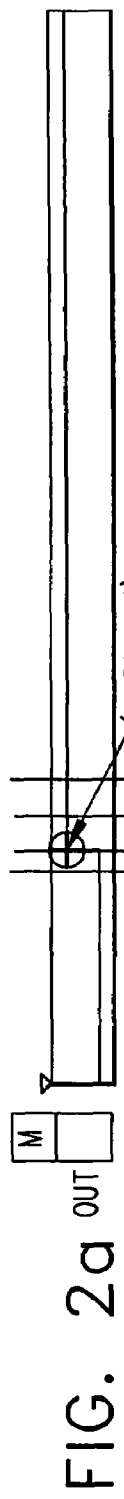
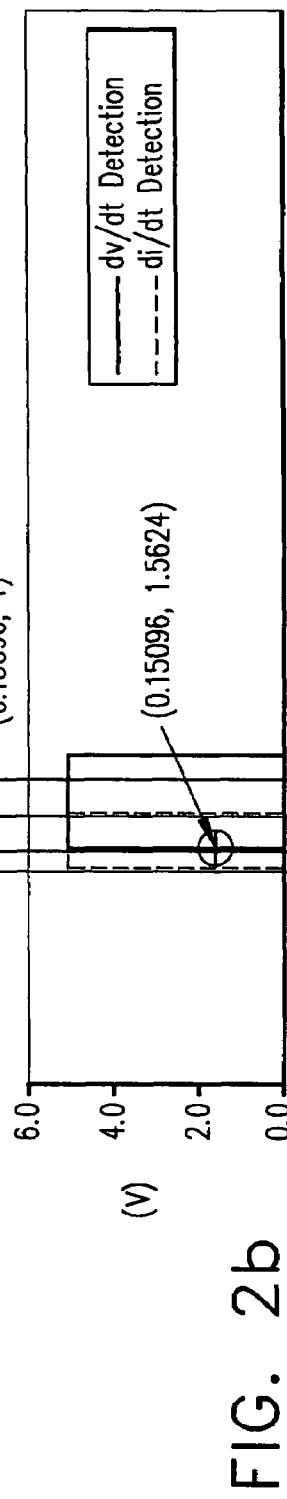
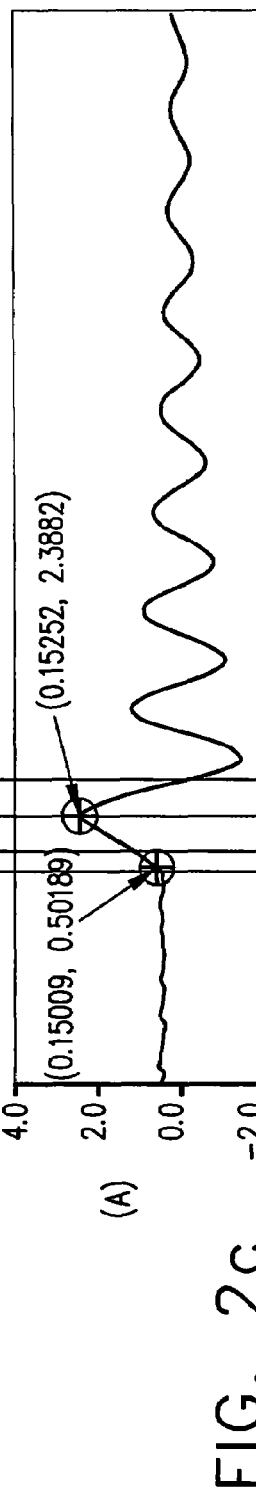
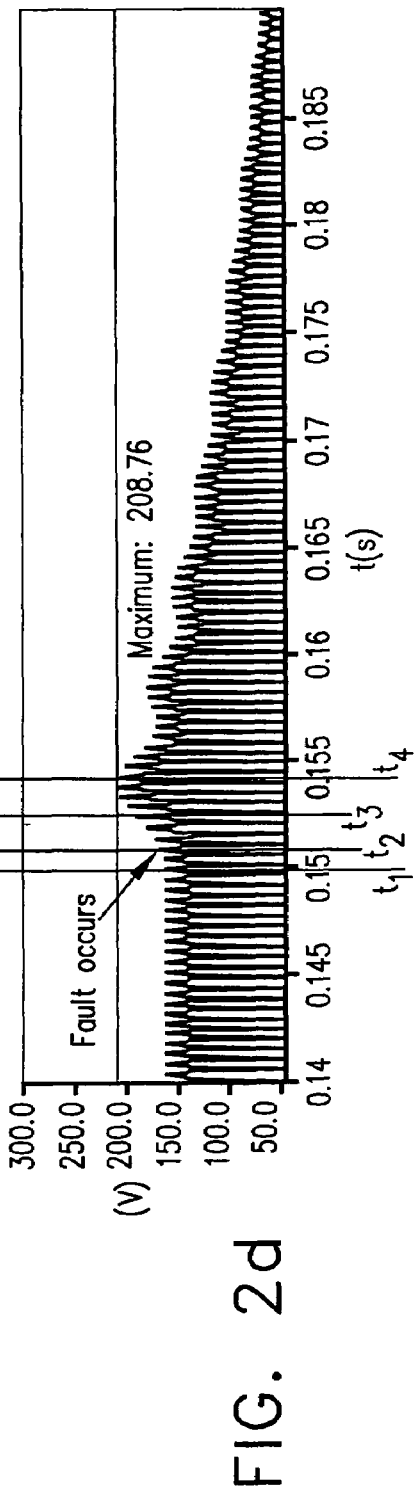
FIG. 2a
FIG. 2b
FIG. 2c
FIG. 2d

METHOD AND APPARATUS FOR GENERATOR CONTROL

This application is a Divisional of application Ser. No. 10/936,399, filed on Sep. 8, 2004, now U.S. Pat. No. 7,196,498 the entire contents of which are hereby incorporated by reference and for which priority is claimed under 35 U.S.C. § 120.

FIELD OF THE INVENTION

The present application is directed to a method and apparatus for controlling a generator, and more specifically, toward a method and apparatus for decreasing the power supplied to a generator when current flowing through a generator field winding ceases to be controlled.

BACKGROUND OF THE INVENTION

Both AC and DC generators may be controlled by regulating the current flowing through a generator field winding. This current is generally supplied though a controlled transistor, frequently a MOSFET. By controlling the field transistor, the generator field current is modulated based on demand to maintain the generator output voltage at a desired level.

One failure mode for a generator may be referred to as an "out of control" failure mode. In this failure mode, a generator control unit fails to control the generator excitation current, and the generator output voltage quickly reaches dangerously high levels. This may damage equipment connected to the generator. The cause of this failure mode may be, for example, a shorted field transistor, or a short of any components that are connected in parallel with the field transistor, or a connector pin short. Because the field switch is a semiconductor device, this is not an uncommon failure mode.

When a short circuit occurs, the field is not controlled and becomes fully excited. As a result, the output voltage of the generator rises quickly to a very high level until the generator becomes saturated. This failure mode can cause problems in constant frequency electrical systems. However, the severity of this failure mode is even greater in variable frequency electrical systems such as those sometimes found on aircraft. Such variable frequency electrical systems are becoming increasingly popular because of their overall lighter weight and increased efficiency.

In a variable frequency system, the generator may operate at frequencies nearly twice as high as the frequencies used in constant frequency systems. The higher the frequency at which a generator operates, the shorter the time it will take to reach an overvoltage condition. Therefore, effective protection against this failure mode in variable frequency systems is becoming an important concern.

Some systems now require generators that limit overvoltage to about 150 V rms for 115V AC electrical systems and to 300V rms for 230V AC electrical systems. A conventional approach to overvoltage protection is to monitor voltage levels and disconnect the field winding when an overvoltage is detected. This approach, however, is too slow to provide effective protection for the above failure mode, especially in a variable frequency system.

FIGS. 4a and 4b illustrate a simulated response to an overvoltage condition by a conventional voltage protection circuit used with a generator operating at 115V, 700 Hz with a light load of 7.5 kW. FIG. 4a is a graph of generator field current having a nominal level of 0.4 amps. FIG. 4b illustrates the average voltage level of the three-phase power supply. A fault occurs at time t1 which leads to an increase in the current level to about 3.2 amps at time t2. At time t3, the generator field voltage peaks at 248.5 V or 176 V rms, well above the 150V rms limit often required in applications employing variable frequency generators. It is therefore desirable to provide a method and apparatus for addressing this failure mode in a manner that limits generator overvoltage and protects components connected to the generator.

SUMMARY OF THE INVENTION

These problems and others are addressed by the present invention which comprises, in a first aspect, a generator control circuit that includes a first circuit monitoring a generator voltage change rate and producing a first output when the voltage change rate is above a first level and a second circuit monitoring a generator current change rate and producing a second output when the current change rate is above a second level. These circuits are connected to a third circuit which decreases the power supplied to the generator when a plurality of conditions are satisfied, the plurality of conditions including the voltage change rate being above the first level and the current change rate being above the second level.

Another aspect of the invention comprises a method of protecting a generator that involves monitoring a rate of generator voltage change, monitoring a rate of generator current change, and reducing the generator output when a plurality of conditions are satisfied. The plurality of conditions include the rate of generator voltage change exceeding a first level and the rate of generator current change exceeding a second level.

An additional aspect of the invention comprises a method of protecting a generator having a field winding connected to a power supply that involves detecting a generator voltage v, detecting a generator current i, differentiating the generator voltage v to obtain a quantity dv/dt and differentiating the generator current i to obtain a quantity di/dt. A number of determinations are then made including a first determination as to whether dv/dt is greater than a first value and a second determination as to whether di/dt is greater than a second value. If each of these determinations is true, the level of power supplied to the generator is reduced.

A further aspect of the invention comprises a control circuit for a generator having a field winding and an output. The circuit includes a field transistor having a gate connected between the generator field winding and ground and a field controller connected to the field transistor gate for controlling current flow through the field winding. A detector monitors a voltage change rate in the generator output and a current change rate in a generator field winding or load current and produces a first output signal when the voltage change rate is above a first level and a second output signal when the current change rate is above a second level. A generator controller is operatively connected to the detector and decreases current flow through the generator field winding upon receipt of the first output signal and the second output signal.

BRIEF DESCRIPTION OF THE DRAWINGS

These features and aspects of the invention will be better understood after a reading of the following detailed description in connection with the below drawings wherein:

FIGS. 2a-2d are graphs illustrating current and voltage levels that result when a simulated generator out of control fault occurs in a system using the protection circuits of FIG. 1;

DETAILED DESCRIPTION

Figure 1:
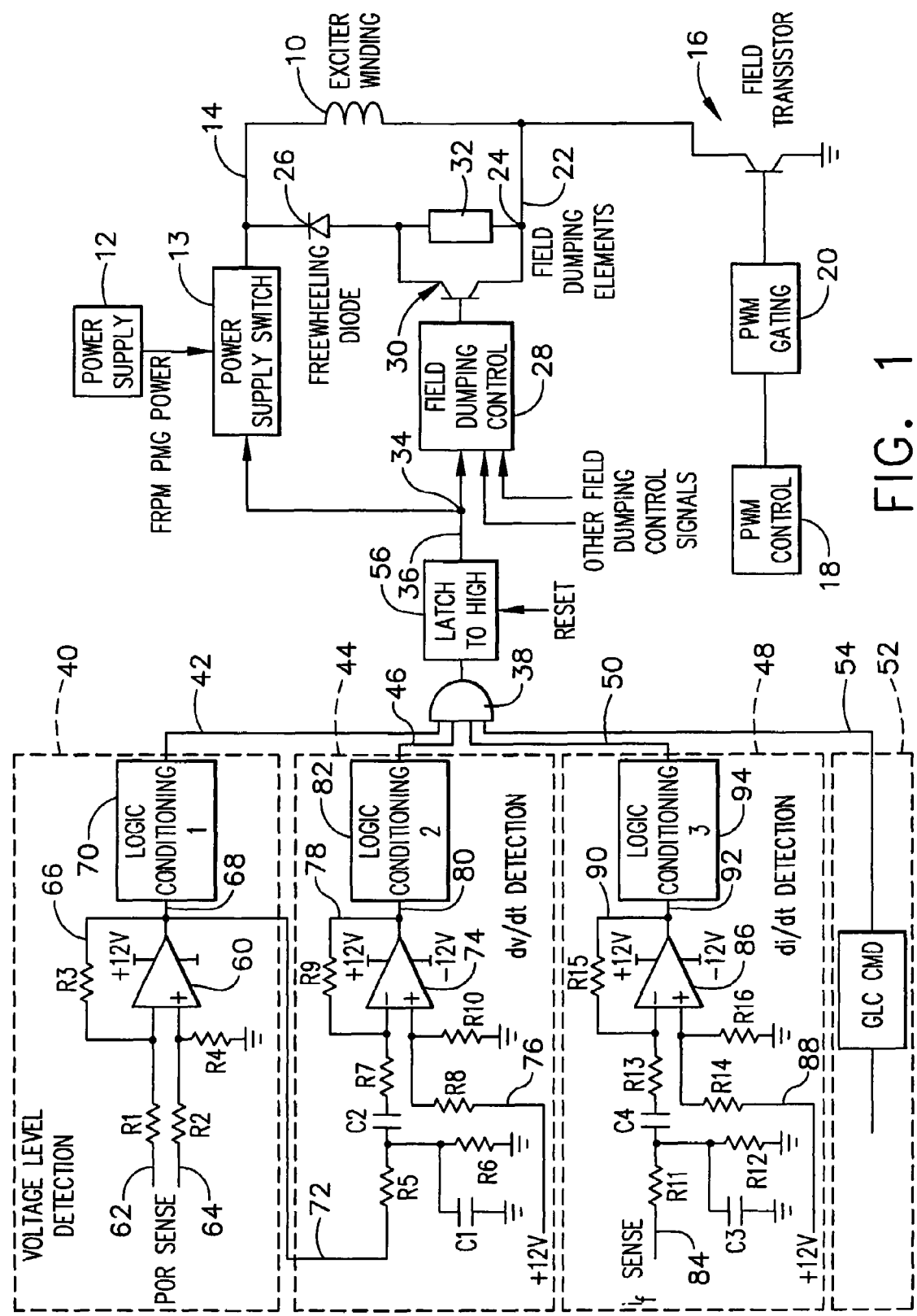
FIG. 1 illustrates, partially schematically, a generator control circuit and detection circuits according to an embodiment of the present invention.

Referring now to the drawings, wherein the showings are for purposes of illustrating preferred embodiments of the invention only and not for the purpose of limiting same, FIG. 1 illustrates a control circuit for a generator (not shown) having an exciter winding 10 connected to a power supply 12 controlled by a switch 13, (preferably a semiconductor switch) by a line 14 and to ground via a field transistor 16. The conductive state of field transistor 16, which is may be, for example, a MOSFET, is regulated by pulse width modulation (PWM) controller 18 via PWM gating 20 to control the output of a generator in a well known manner. A field dumping line 22 connects to a node 24 between exciter winding 10 and field transistor 16. When field transistor 16 is not conducting, current flows from node 24 back to line 14 via freewheeling diode 26. Field dumping control 28 controls transistor 30 to determine a current flow path from node 24 to freewheeling diode 26. When transistor 30 is conducting, current flows through transistor 30 to the freewheeling diode 26, bypassing resistor 32. When transistor 30 is not conducting, current flows through and is dissipated by resistor 32.

The state of power supply switch 13 and field dumping control 28 is determined by the logical state of node 34 on line 36. The signal on line 36 is normally low when the generator is operating in a normal manner. The signal goes high, as described hereinafter, upon the detection of a fault indicative of a failure or bypass of field transistor 16, and this turns off or reduces the output of power supply 12.

Four monitoring circuits provide input to an AND gate 38 on line 36 in this embodiment; when all four inputs to gate 38 are logically high, AND gate 38 outputs a logically high signal on line 36. The monitoring circuits include a generator output voltage detection circuit 40 providing an output on voltage detection output line 42, a dv/dt monitoring circuit 44 producing an output on dv/dt output line 46, a di/dt monitoring circuit 48 producing an output signal on di/dt output line 50 and a generator line contactor (GLC) monitoring circuit 52 producing an output on GLC line 54.

The present inventor has recognized that rapid increases in both generator current and generator voltage are generally indicative of a generator out of control fault. Therefore, dv/dt monitoring circuit 44 and di/dt monitoring circuit 48 sense for rapid changes in both voltage and current levels. Normal system operation may occasionally produce an increase in one or the other of these values, but concurrent increases are generally associated with a fault condition. Because the rate of current and voltage change is sensed rather than the absolute value of these quantities, faults can be detected and corrective action taken before the generator output reaches a dangerous level.

The present inventor has also recognized that under certain transient conditions, dv/dt or di/dt or both may increase when a fault is not present. This may occur, for example, at generator power up and/or when a load is applied to the generator. To prevent those conditions from triggering a fault protection sequence, two additional logically high inputs to AND gate 38 are required before the fault protection system is triggered. First, output voltage detection circuit 40 monitors the generator output voltage and outputs a logically high signal on voltage detection output line 42 only when the voltage is above a nominal level, such as 5 volts, for example, to prevent the signaling of a fault condition on start up before output voltage has reached a stable level. Likewise, GLC monitoring circuit 52 produces a high output on GLC output line 54 only when the GLC is closed to prevent the triggering of a failure mode when the GLC is open. Thus, when logically high signals appear on voltage detection output line 42, on dv/dt output line 46, on di/dt output line 50 and on GLC line 54, AND gate 38 produces a logically high signal on line 36, which signal is latched to a high level by latch 56, and triggers a shutdown of the generator.

In one embodiment of the invention, output voltage detection circuit 44 comprises a first operational amplifier 60 connected to +12V and −12V power supplies and having a first line 62 connected to the output of a generator (not shown) at the point of regulation (POR) and to the inverting input of first op amp 60 through a first resistor R1, and a second line 64 connected to the output of the generator and the non-inverting input of op amp 60 through a second resistor R2 where first and second resistors R1 and R2 each have a resistance of, for example, 75 kΩ. (Resistance and capacitance values provided herein are for the purpose of illustrating a suitable example of a protection circuit according to an embodiment of the present invention and are not intended to limit the invention to the use of resistors and capacitors having these values.) A third line 66 provides feedback from the output of the first op amp 60 to the inverting input thereof through a third resistor R3 (1.43 kΩ), while second line 64 is connected to ground thorough a fourth resistor R4 (1.43 kΩ). The output of first op amp 60 on fourth line 68 is conditioned by first logic conditioning circuit 70 which outputs a specific signal, assumed to be logically high for this example, on line 42 when the generator output voltage on first line 62 and on second line 64 is at least 5V.

The dv/dt detection circuit 44 receives as an input the output voltage of first op amp 60 on a fifth line 72 connected to the inverting input of a second op amp 74. Fifth line 72 includes a fifth resistor R5 (10 kΩ) and is connected to ground at a point between fifth resistor R5 and first op amp 60 via a sixth resistor R6 (2 MΩ) and a first capacitor C1 (0.22 µF) arranged in parallel. First capacitor C1 filters the incoming signal, and its value is chosen so that normal noise on fifth line 72 does not trigger dv/dt detection circuit 44. Fifth line 72 further includes a second capacitor C2 (0.01 µF) and a seventh resistor R7 (50 kΩ) between fifth resistor R5 and the inverting input of second op amp 74. The value of second capacitor C2 determines the sensitivity of the dv/dt detector. The non-inverting input of second op amp 74 is connected to a 12V power source by a sixth line 76 through an eighth resistor R8, and sixth line 76 is connected to ground through a tenth resistor R10 (100 kΩ). Seventh line 78 provides feedback from the output of second op amp 74 to the inverting input of second op amp 74 through a ninth resistor R9 (150 kΩ), and the output of second op amp 74 on eighth line 80, which is proportional to the derivative of the voltage on first line 62, is conditioned by second logic conditioning circuit 82 to produce a logically high output on dv/dt output line 46 when a voltage change is detected.

The di/dt monitoring circuit 48 receives a current input on ninth line 84, which current is normally the generator field winding current. However, in systems where some minimum load is always connected to the generator, the load current can be monitored instead. Ninth line 84 is connected to the inverting input of a third op amp 86. Ninth line 84 includes an eleventh resistor R11 (12 kΩ) and is connected to ground at a point between eleventh resistor R11 and third op amp 86 via a twelfth resistor R12 (2 MΩ) and a third capacitor C3 (0.22 μF) arranged in parallel. Third capacitor C3 filters the incoming signal, and its value is chosen so that normal noise on ninth line 84 does not trigger di/dt detection circuit 48. Ninth line 84 further includes a fourth capacitor C4 (0.01 μF) and thirteenth resistor R13 (50 kΩ) between eleventh resistor R11 and the inverting input of third op amp 86. The value of third capacitor C3 determines the sensitivity of the di/dt detector. The non-inverting input of third op amp 86 is connected to a 12V power source by a tenth line 88 through a fourteenth resistor R14, and tenth line 88 is connected to ground through a sixteenth resistor R16 (100 kΩ). Eleventh line 90 provides feedback from the output of third op amp 86 to the inverting input of third op amp 86 through a fifteenth resistor R15 (150 kΩ), and the output of third op amp 86 on twelfth line 92, which is proportional to the derivative of the current on ninth line 84, is conditioned by third logic conditioning circuit 94 which produces a logically high output on di/dt output line 50 when a current change of a given magnitude is detected.

GLC monitoring circuit 52 provides a logically high output on line 54 when the generator line contactor is closed.

In normal operation, current flow through exciter winding 10 is controlled by field transistor 16 which in turn is controlled by PWM control 18. During normal operation, the signal on generator output detection line 42 is high because the output of the generator is more than about 5V. Likewise, the signal on GLC line 54 is high because the generator line contactor is closed. However, under normal operating conditions, the outputs of dv/dt monitoring circuit 44 and di/dt monitoring circuit 48 are logically low because rapid voltage and current changes do not normally occur during generator operation absent a fault condition. However, transient changes could potentially change the current or voltage level in a manner that causes the signal on either dv/dt output line 46 or di/dt output line 50 high for a brief period. The present inventor has found, however, that monitoring both these lines and triggering a fault protection process only when both signals go high, provides reliable generator fault protection.

FIGS. 2a-2d illustrate voltage and current levels during a simulated generator out of control fault and show how such a fault is handled by the protective circuitry of one embodiment of the present invention. As illustrated in FIG. 2c, generator field current begins to increase at time t1 which produces a positive di/dt as illustrated by the dotted line in FIG. 2b. This positive di/dt is detected by di/dt monitoring circuit 48 and causes the signal on di/dt output line 46 to go high. At time t2, about 0.1 msec after the fault occurs, an increase in generator output voltage is seen, and this voltage change is detected as illustrated by the solid line in FIG. 2b which causes the output of dv/dt monitoring circuit 44 to go high at time t2. At this point all four inputs to AND gate 38 are high, and the output of AND gate 38 becomes logically high at this time as illustrated in FIG. 2a. This high signal activates field dumping control 28 and opens switch 13 to disconnect power supply 12 from line 14 and the exciter winding 10. Field current peaks at time t3, as illustrated in FIG. 2c, and generator output voltage peaks at time t4 at a level of about 208 volts (about 148V rms) for this 115V system. As will be appreciated from the above, the fault protection system of this embodiment of the present invention responds quickly to faults and thus provides improved protection for both the generator and equipment connected thereto.

Figure 3:
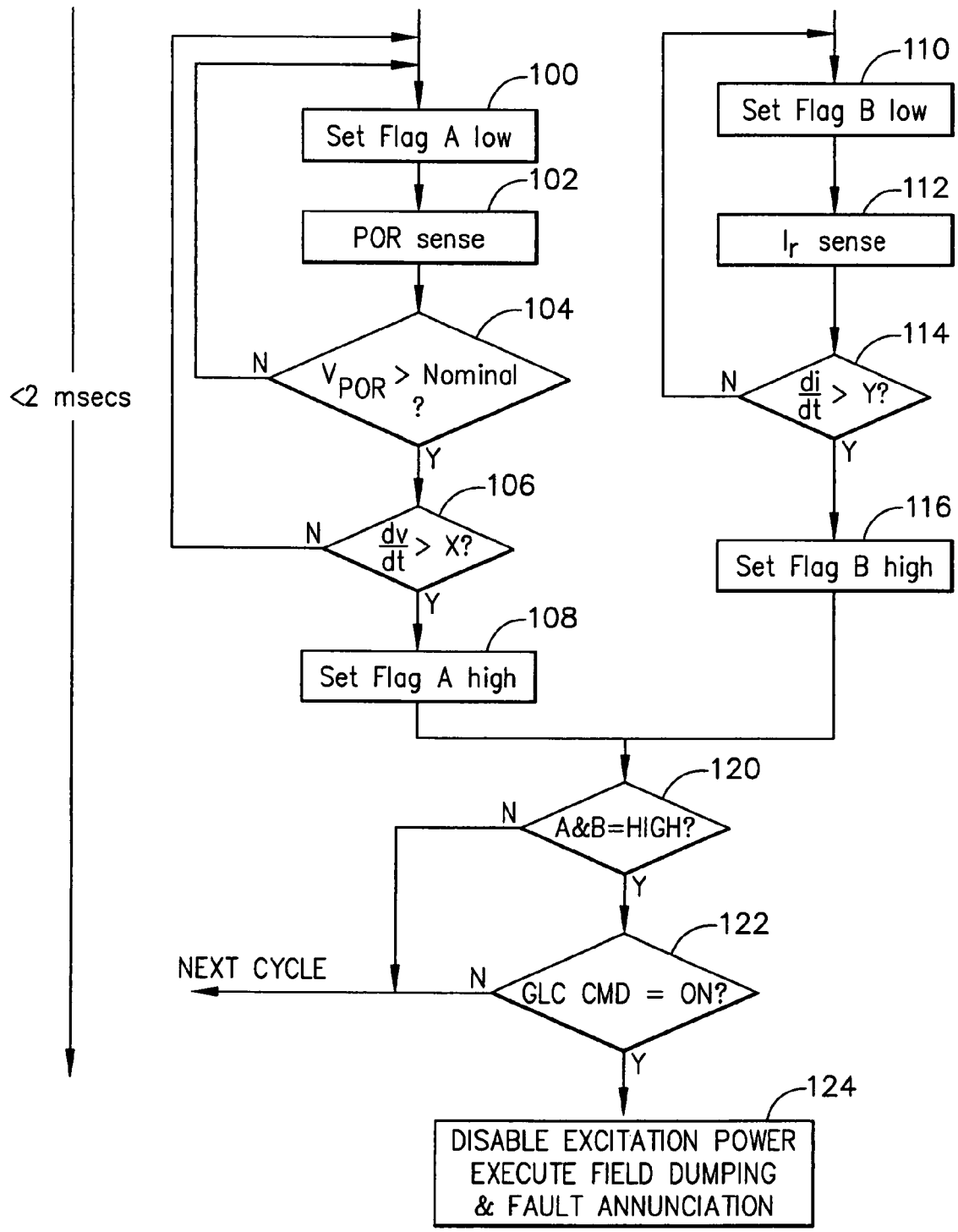
FIG. 3 is a flow chart illustrating the steps followed in performing the method of an embodiment of the present invention.
Figure 4A:
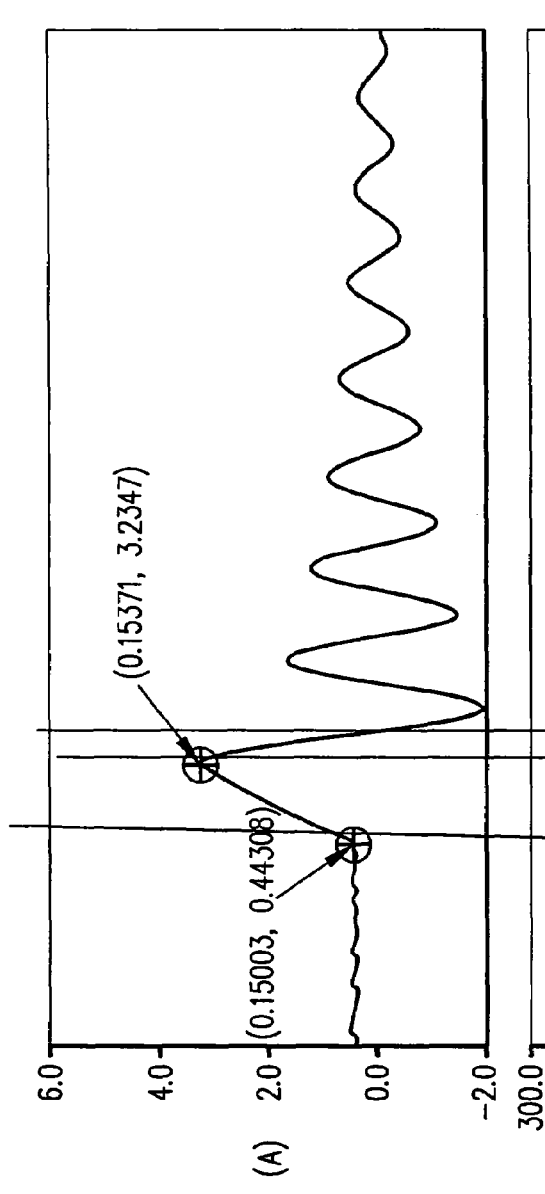
FIGS. 4a and 4b are graphs illustrating current and voltage levels that result when a simulated generator out of control fault occurs in a system using a conventional overvoltage protection system.
Figure 4B:
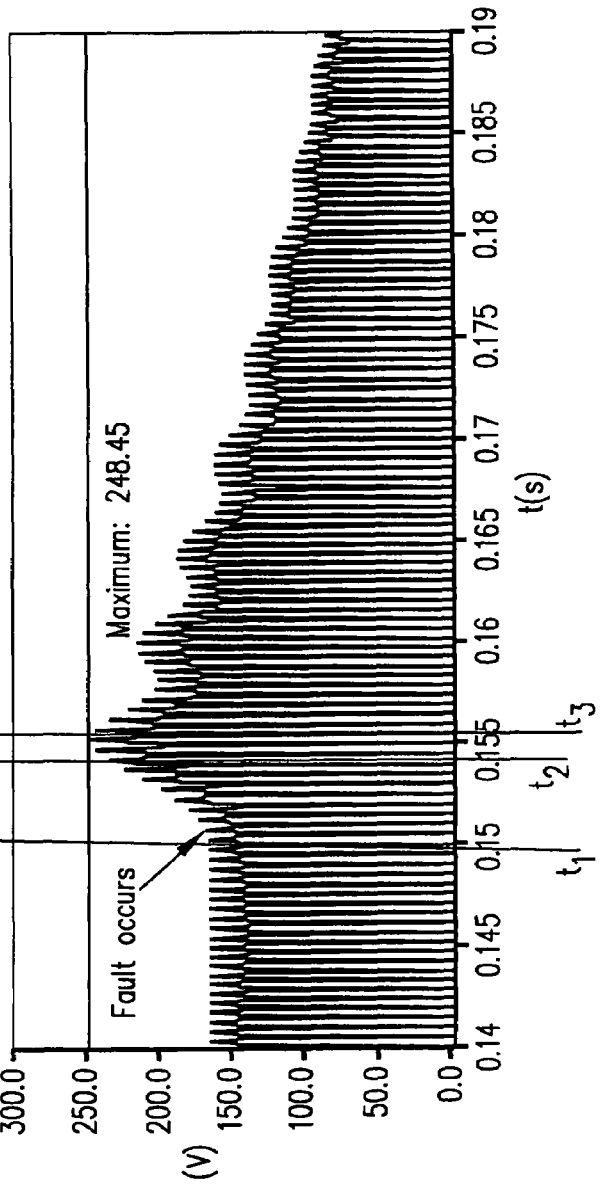

FIG. 3 illustrates the logical steps followed by the fault protection system of an embodiment of the present invention. At a step 100, a first flag A is set to low and the generator output voltage is sensed at step 102. A determination is made at step 104 as to whether the sensed generator output voltage is greater than a predetermined nominal level such as 5 V, for example. If the sensed voltage is not greater than this nominal level, the process returns to step 100. If the sensed voltage is greater than the nominal level, a determination is made at a step 106 as to whether the voltage level is changing more quickly than a certain rate. If the voltage level is not changing at such a rate, the process returns to step 100. If the voltage is changing at a rate greater than a predetermined rate, flag A is set to high at step 108.

Concurrently with steps 100 through 108, steps 110 through 116 are performed. At step 110 a flag B is set to low and a current level is sensed at a step 112. A determination is made at step 114 as to whether the current is changing more quickly than a certain rate. If such a current rate change is not detected, the process returns to step 110. If the current is changing more quickly than this rate, flag B is set to high at step 116.

A determination is made at step 120 as to whether both flag A and flag B are high. If both flags are not high, flags A and B are set to low and the two sensing processes described above repeat from steps 100 and 110, respectively. If both flags are high, a determination is made at a step 122 as to whether a generator line contactor is closed. If the generator line contactor is open, flags A and B are set to low and the process repeats from steps 100 and 110 discussed above. If both flags are high and the generator line contactor is closed, generator excitation power is disabled at step 124.

The invention has been described in terms of a preferred embodiment; however obvious modifications and additions comprises a part of the present invention to the extent they fall within the scope of the several claims appended hereto.

What is claimed is:

1. A method of protecting a generator comprising the steps of:
monitoring a rate of generator voltage change;
monitoring a rate of generator current change; and
reducing the generator output when a plurality of conditions are satisfied, the plurality of condition including the rate of generator voltage change exceeding a first level and the rate of generator current change exceeding a second level.

2. The method of claim 1 wherein the generator being in a normal operating mode comprises one of the plurality of conditions.

3. The method of claim 1 wherein a generator line contactor being closed comprises one of the plurality of conditions.

4. A method of protecting a generator having a field winding connected to a power supply comprising the steps of:
detecting a generator voltage v;
detecting a generator current i;

differentiating the generator voltage v to obtain a quantity dv/dt;

differentiating the generator current i to obtain a quantity di/dt;

making a number of determinations including a first determination whether dv/dt is greater than a first value and a second determination whether di/dt is greater than a second value; and if each of the number of determinations is true, reducing a level of power supplied to the generator.

5. The method of claim 4 wherein said step of reducing a level of power supplied to the generator comprises the step of reducing current flow through a generator field winding.

6. The method of claim 5 wherein said step of reducing current flow through a generator field winding comprises the step of sending a signal through a first line to a generator field dumping controller.

7. The method of claim 4 wherein said step of reducing current flow through a generator field winding comprises the step of operably disconnecting the generator from a power supply.

8. The method of claim 6 including the additional step of monitoring the first line, and, if a signal is detected, latching the signal to a high state.

9. The method of claim 4 wherein said step of detecting a generator current comprises the step of detecting a generator current in the field winding.

10. The method of claim 4 wherein said step of detecting a generator current comprises the step of detecting a generator output current.

11. The method of claim 4 wherein said step of making a number of determinations comprises the step of making a third determination whether the output voltage v is greater than a third value.

12. The method of claim 11 wherein said step of making a number of determinations comprises the step of making a fourth determination whether a generator line contactor is closed.

\* \* \* \* \*